United States Patent
Hsu et al.

(10) Patent No.: US 9,341,809 B2
(45) Date of Patent: May 17, 2016

(54) LENS FOCUSING DEVICE

(75) Inventors: Shang-Yu Hsu, Yangmei Taoyuan (TW);
Kun-Shih Lin, Yangmei Taoyuan (TW);
Fu-Yuan Wu, Yangmei Taoyuan (TW)

(73) Assignee: TDK TAIWAN CORPORATION,
Taipei (TW)

( * ) Notice: Subject to any disclaimer, the term of this patent is extended or adjusted under 35 U.S.C. 154(b) by 121 days.

(21) Appl. No.: 13/588,519

(22) Filed: Aug. 17, 2012

(65) Prior Publication Data

US 2014/0049847 A1 Feb. 20, 2014

(51) Int. Cl.
G02B 7/02 (2006.01)
G02B 7/08 (2006.01)
H02K 41/035 (2006.01)

(52) U.S. Cl.
CPC .............. *G02B 7/08* (2013.01); *H02K 41/0356* (2013.01)

(58) Field of Classification Search
CPC .............. G02B 7/08; G02B 7/02; G02B 7/04; G02B 7/102; G02B 7/22; G02B 7/026; G02B 27/646; G02B 13/001; G02B 27/64; H02K 41/0356
USPC .................................. 359/822–826, 814, 829
See application file for complete search history.

(56) References Cited

U.S. PATENT DOCUMENTS

| | | | |
|---|---|---|---|
| 7,554,600 B2 * | 6/2009 | Yasui | G02B 7/102 348/360 |
| 7,699,619 B2 * | 4/2010 | Mizumura | 439/71 |
| 2006/0181632 A1 * | 8/2006 | Makii et al. | 348/335 |
| 2010/0060994 A1 * | 3/2010 | Akabane et al. | 359/696 |
| 2010/0061000 A1 * | 3/2010 | Higuchi | G02B 7/08 359/824 |
| 2011/0044679 A1 * | 2/2011 | Yoshida | G02B 7/08 396/133 |
| 2011/0058268 A1 * | 3/2011 | Kokichi | 359/824 |
| 2012/0050895 A1 * | 3/2012 | Kotanagi | G02B 7/025 359/823 |
| 2012/0057252 A1 * | 3/2012 | Ishiguro et al. | 359/824 |

* cited by examiner

*Primary Examiner* — Ricky Mack
*Assistant Examiner* — Daniele Manikeu
(74) *Attorney, Agent, or Firm* — Muncy, Geissler, Olds & Lowe PC

(57) ABSTRACT

A lens focusing device includes a lens holder for holding a lens therein, a base, and an electrically conductive spring member elastically connected to between the lens holder and the base. The base is provided on a side wall with two terminal recesses, in which two connecting terminals are disposed. The connecting terminals respectively include a first terminal portion forward extended along a light axis to electrically connect to the spring member, a second terminal portion rearward extended along the light axis, and a connecting portion located between the first and the second terminal portion. The spring member is further electrically connected to two ends of a winding wound around the lens holder, so that external electric current can be supplied to the winding via the connecting terminals and the spring member for driving the lens holder to move relative to the base along the light axis.

9 Claims, 9 Drawing Sheets

1

LENS FOCUSING DEVICE

FIELD OF THE INVENTION

The present invention relates to a lens focusing device, and more particularly to a lens focusing device that can be used with a cell phone or a camera for shooting pictures.

BACKGROUND OF THE INVENTION

Generally, a lens focusing device can be used with a variety of handheld devices, such as cell phones, cameras, tablet computers, notebook computers and the like, as well as with various types of webcams, to serve as a lens auto-focusing means during picture shooting.

The lens focusing device includes at least two power supply terminals for connecting to an external circuit board, such as the circuit board of the cell phone, so that electric power or electric signals can be provided via the power supply terminals to a voice coil motor in the lens focusing device for driving a lens holder to move forward and rearward for focusing purpose.

In a conventional lens focusing device, the power supply terminals thereof are either integrally formed with a spring plate in the lens focusing device or electrically connected to the spring plate by hot melting or welding. While the power supply terminals integrally formed with the spring plate can ensure good electrical conductivity thereof, they must be extended through a base of the lens focusing device during assembling to cause troubles in manufacturing process of the lens focusing device.

In the case of connecting the power supply terminals to the spring plate by hot melting or welding, the power supply terminals are previously embedded in the base during the process of forming the base. Thus, it is necessary to make certain the embedded power supply terminals and the spring plate are in good electrical connection to one another because poor or bad electrical connection of the power supply terminals to the spring plate would result in defects in the completed lens focusing device.

SUMMARY OF THE INVENTION

A primary object of the present invention is to provide a lens focusing device, in which connecting terminals can be easily and accurately fixed to predetermined positions to ensure good electrical connection of them with a conductive spring member in the lens focusing device.

To achieve the above and other objects, the lens focusing device according to a preferred embodiment of the present invention includes a lens holder for holding a lens therein; a base supporting the lens holder thereon while the lens holder is movable relative to the base for focusing purpose; an electrically conductive spring member elastically connected to between the base and the lens holder; two terminal recesses provided on a side wall of the base; and two connecting terminals separately set in the terminal recesses to electrically connect with the spring member. The connecting terminals respectively include a first terminal portion extended in a direction of a light axis of the lens toward a light-in side thereof to approach and connect to the spring member; a second terminal portion extended in the direction of the light axis of the lens toward a light-out side thereof; and a connecting portion connected to between the first terminal portion and the second terminal portion.

According to the lens focusing device of the present invention, the terminal recesses respectively include a receiving groove, a communicating groove, and a notch. The communicating groove has one open side formed on each of a light-in side and the side wall of the base, the opening of the communicating groove on the side wall communicates with the receiving groove and the notch. The connecting terminals are set in the terminal recesses by disposing their connecting portions in the receiving grooves, the first terminal portions in the communicating grooves, and the second terminal portion in the notches. Therefore, the assembling of the connecting terminals to the base is simple and accurate.

In the present invention, the first terminal portions and the second terminal portions of the connecting terminals are extended toward a light-in side and a light-out side of the light axis, respectively. The first terminal portions are extended to and projected from the light-in side of the base to connect with the spring member, ensuring good electrical connection between the spring member and the connecting terminals. The second terminal portions are extended opposite to the first terminal portions to an outer side of the base, enabling the connecting terminals to easily connect to an external circuit board.

In the present invention, the spring member includes a plurality of outer ring portions, a part of which are provided with a through hole; and the first terminal portions respectively have a projected portion, which are projected from a spring-member mounting face of the base to further extend through the through holes to thereby connect with the spring member. Thus, electric current can be continuously smoothly supplied to the spring member via the connecting terminals, and the connecting terminals can be effectively protected against separating from the base.

In the preferred embodiment, the lens focusing device includes two connecting terminals, and the terminal recesses provided on the base can have a configuration corresponding to that of the connecting terminals for fitly receiving the connecting terminals therein. In the preferred embodiment, the lens holder also has a winding wound around an outer side of the lens holder, and the spring member includes a first part and a second part that are separated and electrically insulated from each other. The first part of the spring member is connected to the first terminal portion of one connecting terminal and an end of the winding; and the second part of the spring member is connected to the first terminal portion of the other connecting terminal and another end of the winding, so that electric current can flow from the connecting terminals to the winding via the spring member.

With the above arrangements, the lens focusing device of the present invention has advantages in production because it includes terminals for supplying electric power to the winding, and the power supply terminals can be easily and accurately assembled to the base and the spring member.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof and with reference to the accompanying drawings.

Figure 1:
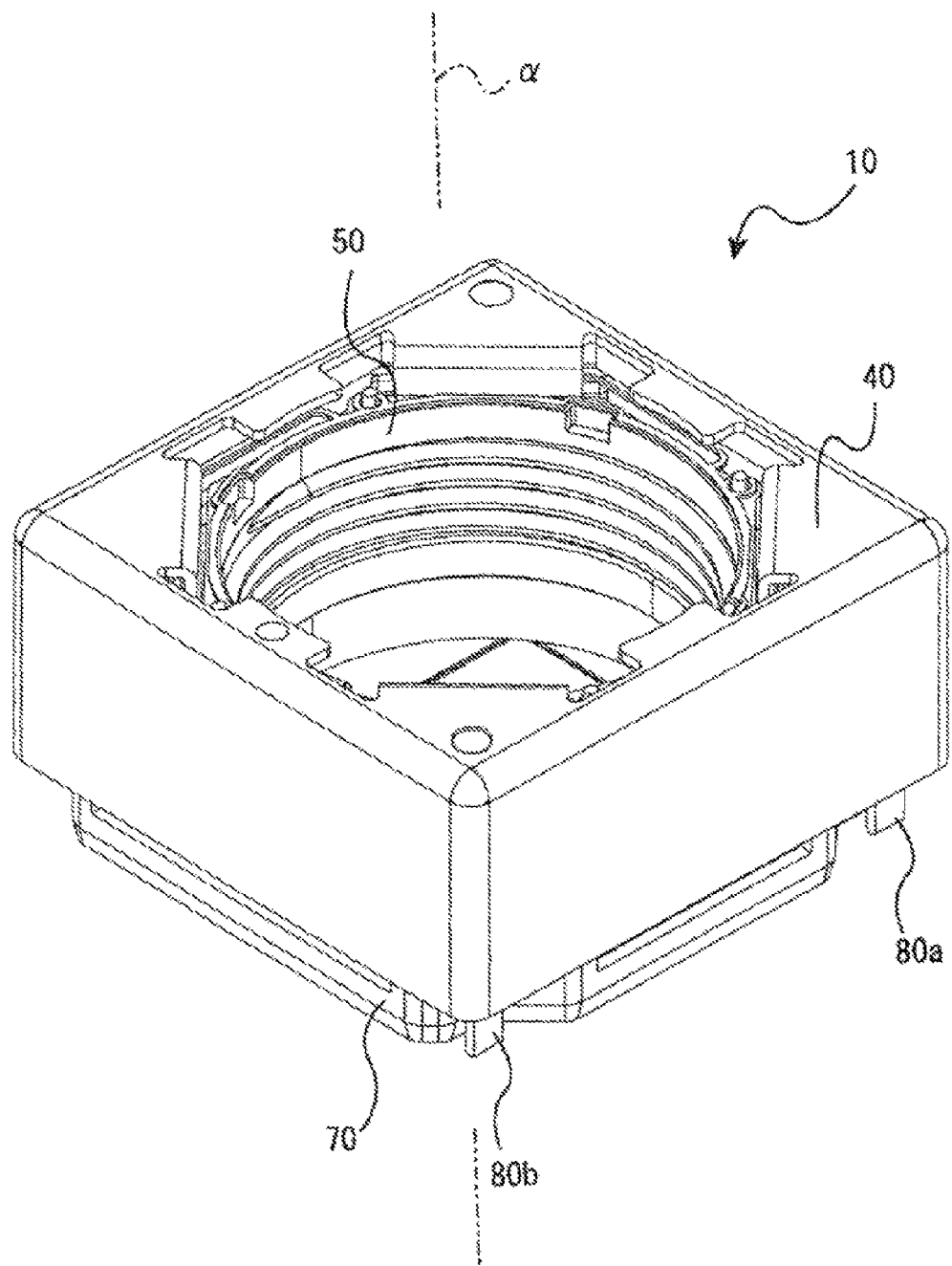
FIG. 1 is an assembled perspective view of a lens focusing device according to a preferred embodiment of the present invention.
Figure 2:
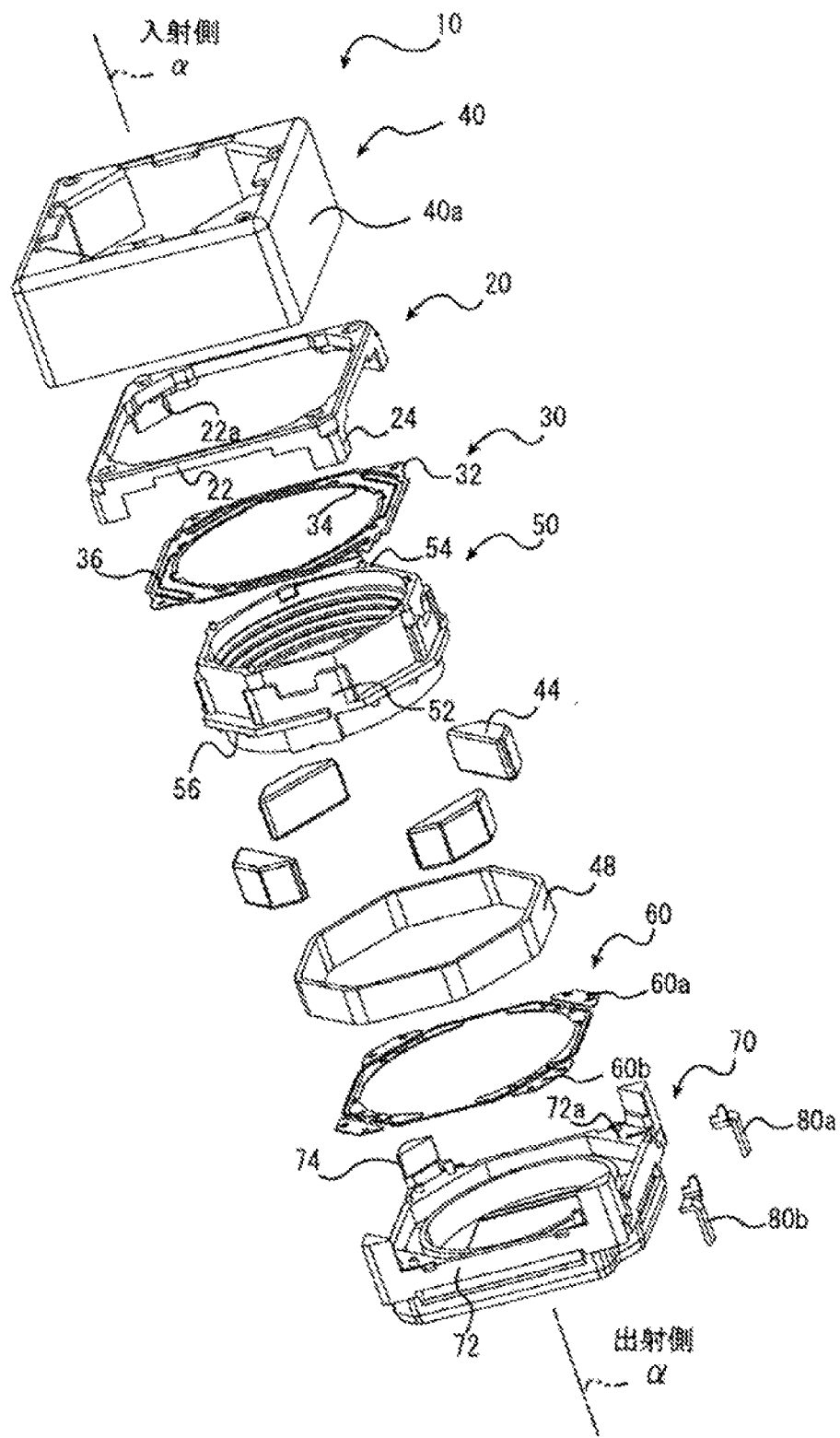
FIG. 2 is an exploded view of FIG. 1.

Please refer to FIGS. 1 and 2 that are assembled and exploded perspective views, respectively, of a lens focusing device 10 according to an embodiment of the present invention. As shown, the lens focusing device 10 has a substantially rectangular appearance, and mainly includes a lens holder 50, a yoke 40, and a base 70. The lens holder 50 is located at a central portion of the lens focusing device 10 for holding a lens therein (not shown). The yoke 40 is located at an outer side of the lens holder 50 to enclose the lens holder 50 and the base 70 therein.

The base 70 supports the lens holder 50 thereon, such that the lens holder 50 is movable relative to the base 70 for focusing purpose. The lens focusing device 10 internally includes a voice coil motor, which drives the lens holder 50 to move relative to the base 70 along a light axis "α". Herein, when viewing along the light axis α, one side of the lens focusing device 10, from where light enters the lens, is referred to as a light-in side; and an opposite side of the lens focusing device 10, from where the light leaves the lens, is referred to as a light-out side. The lens focusing device 10 with an image sensor (not shown) arranged on the light axis α at the light-out side thereof can serve as a camera module. However, the lens focusing device 10 can be used in a wide range of other applications.

As can be seen in FIG. 2, along the light axis α from the light-in side toward the light-out side, the lens focusing device 10 further includes a top cover 20 and an upper spring member 30 located between the yoke 40 and the lens holder 50, and a plurality of magnets 44, a winding 48, and a spring member 60 located between the lens holder 50 and the base 70. The lens focusing device 10 also includes a first and a second connecting terminal 80a, 80b mounted on the base 70.

In the illustrated embodiment, the top cover 20 is attached to an inner side of the yoke 40, and the yoke 40 includes a peripheral wall 40a that locates around the base 70 to cover the latter. The yoke 40 is not restricted to any particular shape, so long as it can receive the top cover 20 therein and externally cover the base 70. In the illustrated embodiment, the yoke 40 is a single substantially rectangular part. However, like the magnets 44, the yoke 40 can also be assembled from several parts.

The upper spring member 30 is connected to the top cover 20 and is located at the light-in side of the lens holder 50 to support the latter thereon. The top cover 20 includes a substantially rectangular top cover frame portion 22 and four top cover post portions 24 extended from four corners of the top cover frame portion 22 in the direction of the light axis α toward the light-out side. The top cover frame portion 22 is formed on its light-out side with an upper-spring-member mounting face 22a. The upper spring member 30 includes an outer ring portion 32, an inner ring portion 34, and an arm portion 36 elastically connecting the outer ring portion 32 to the inner ring portion 34. The outer ring portion 32 of the upper spring member 30 is fixed to the upper-spring-member mounting face 22a using an adhesive. The base 70 is substantially rectangular in shape and includes a base frame portion 72 defining a central opening and four base post portions 74 extended from four corners of the base frame portion 22 in the direction of the light axis α toward the light-in side. The top cover post portions 24 are correspondingly connected to the base post portions 74 using an adhesive.

As can be seen in FIG. 2, the upper spring member 30 is elastically connected to between the top cover 20 and the lens holder 50. The lens holder 50 is supported by the upper spring member 30 and the spring member 60 to locate between the top cover 20 and the base 70 and is freely movable along the direction of the light axis α.

The outer ring portion 32 of the upper spring member 30 is fixed to the upper-spring-member mounting face 22a of the top cover frame portion 22. The inner ring portion 34 of the upper spring member 30 is located at an inner side of the outer ring portion 32 and is connected to a light-in-side inner-ring mounting face 54 of the lens holder 50 using an adhesive.

The upper spring member 30 is made of an elastic metal material and the arm portion 36 thereof is elastically deformable. Being connected to the outer ring portion 32 via the elastically deformable arm portion 36, the inner ring portion 34 is elastically movable relative to the outer ring portion 32 along the direction of the light axis α.

The magnets 44 are clamped between the top cover frame portion 22 of the top cover 20 and the base frame portion 72 of the base 70. In the illustrated embodiment, the magnets 44 are arranged adjacent to an inner side of the top cover post portions 24 and the base post portions 74 to locate at four corners of the lens focusing device 10. When the lens focusing device 10 is in a fully assembled state, the magnets 44 are outwardly faced toward the winding 48, which is fitted on a winding mounting surface 52 surrounding an outer side of the lens holder 50. In the illustrated embodiment, the magnets 44, the yoke 40 and the winding 48 together constitute the voice coil motor for driving the lens holder 50 to move.

Figure 3:
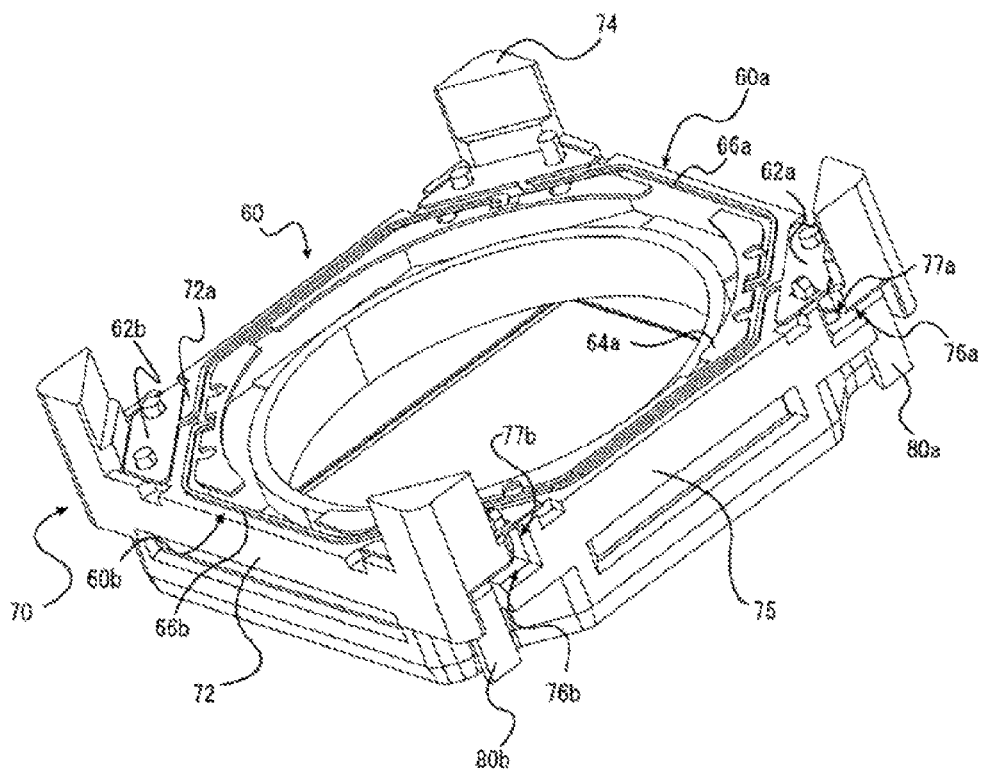
FIG. 3 is a perspective view showing a base of the lens focusing device with a spring member mounted thereon.
Figure 5:
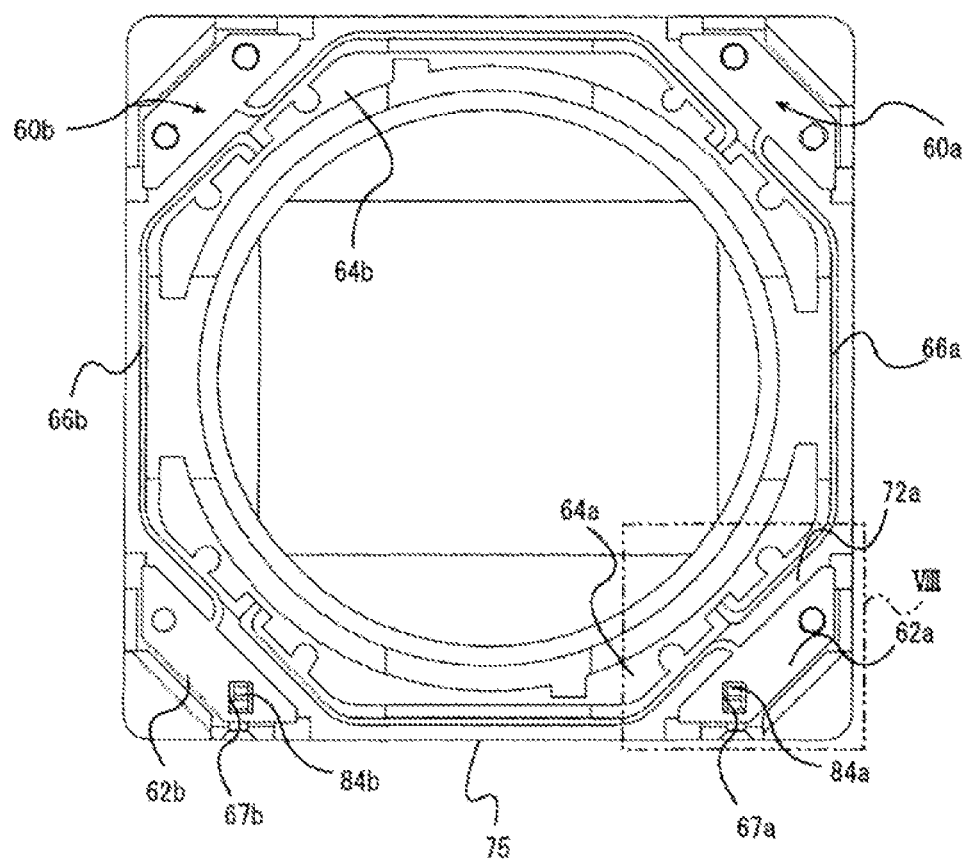
FIG. 5 is a top plan view of FIG. 3.

FIG. 3 is a perspective view showing a base 70 of the lens focusing device 10 with the spring member 60 mounted thereon, and FIG. 5 is a top plan view of FIG. 3. Please refer to FIGS. 3 and 5 along with FIG. 2. The spring member 60 is connected to between the base 70 and the lens holder 50, and includes a first part 60a and a second part 60b that are separated and electrically insulated from each other. The first part 60a includes a first outer and a first inner ring portion 62a, 64a, as well as a first arm portion 66a; and the second part 60b includes a second outer and a second inner ring portion 62b, 64b, as well as a second arm portion 66b. Except for having two separated parts 60a, 60b, the spring member 60 is generally structurally similar to the upper spring member 30.

A first end of the winding 48 is connected to the first outer ring portion 62a and the first inner ring portion 64a of the spring member 60 (also referring to FIG. 5). The spring member 60 is electrically conductive, allowing electric current to flow therethrough to the first end of the winding 48; and a second end of the winding 48 is connected to the second outer ring portion 62b and the second inner ring portion 64b of the spring member 60 (also referring to FIG. 5), so that electric current can be conducted to the second end of the winding 48 via the spring member 60 to form a circuit loop.

As can be seen in FIG. 2, the lens holder 50 is in the shape of a hollow cylinder for holding a lens therein (not shown), and the light-in-side inner-ring mounting face 54 is located at an end of the lens holder 50 facing toward the light-in side. An opposite end of the lens holder 50 facing toward the light-out side provides a light-out-side inner-ring mounting face 56, to which the first and second inner ring portions 64a, 64b of the spring member 60 are fixed (also referring to FIG. 5).

As can be seen in FIG. 2, one end of the base frame portion 72 of the base 70 facing toward the light-in side provides a spring-member mounting face 72a, to which the first and second outer ring portions 62a, 62b of the spring member 60 are fixed. The first and second inner ring portions 64a, 64b are located at an inner side of the first and second outer ring portions 62a, 62b, respectively, and are fixed to the light-out-side inner-ring mounting face 56 of the lens holder 50 using an adhesive. The first arm portion 66a elastically connects the first outer ring portion 62a to the first inner ring portion 64a, while the second arm portion 66b elastically connects the second outer ring portion 62b to the second inner ring portion 64b.

Like the upper spring member 30, the spring member 60 is also made of an elastic metal material, so that the first and second arm portions 66a, 66b are elastically deformable. Being respectively elastically connected to the first and second outer ring portions 62a, 62b via the elastically deformable first and second arm portions 66a, 66b, the first and second inner ring portions 64a, 64b are movable relative to the first and the second outer ring portion 62a, 62b, respectively, along the direction of the light axis α.

With the above arrangements, the base 70 is connected to the lens holder 50 via the spring member 60, and the top cover 20 is connected to the lens holder 50 via the upper spring member 30, so that the lens holder 50 is movable relative to the base 70.

Figure 4:
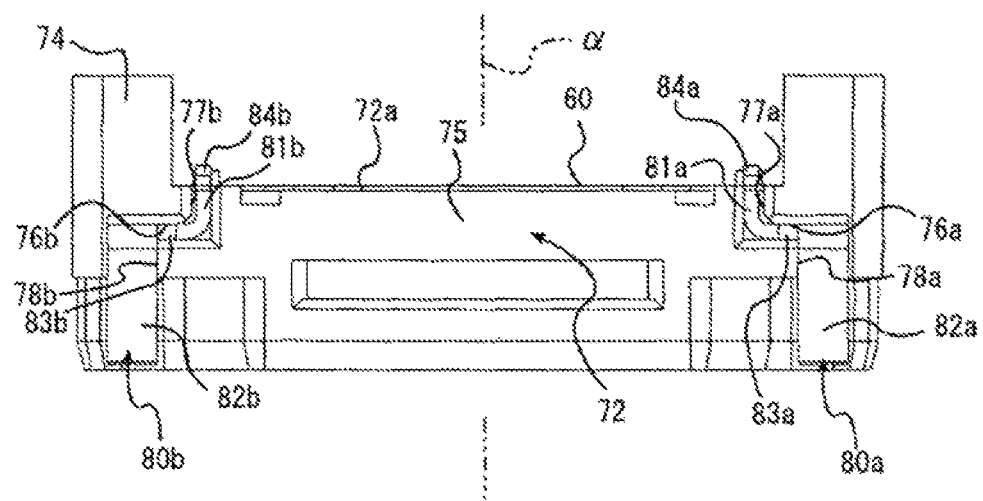
FIG. 4 is a side view of FIG. 3.
Figure 6:
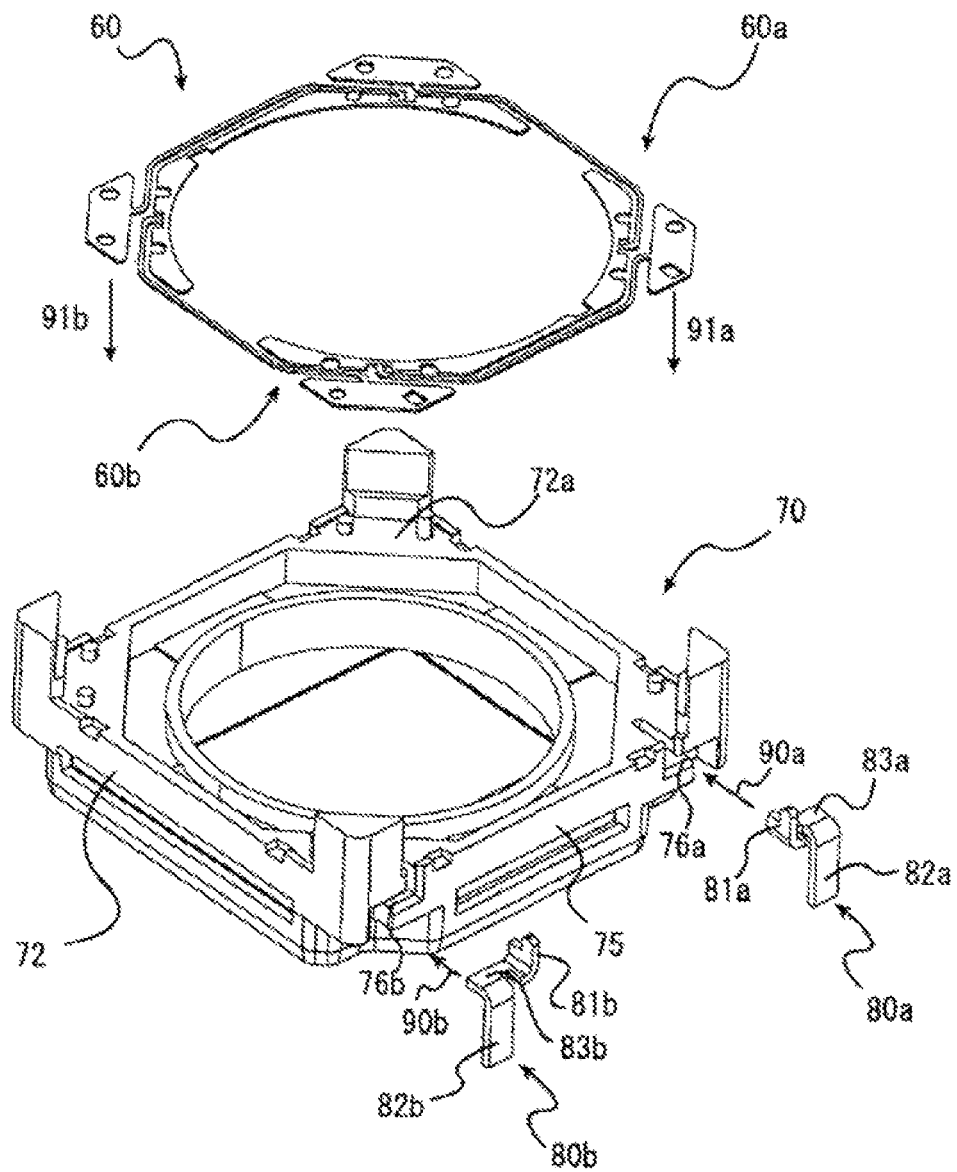
FIG. 6 is an exploded perspective view of FIG. 3 showing the assembling of the spring member and two connecting terminals to the base of the lens focusing device of the present invention.

FIG. 4 is a side view of FIG. 3, and FIG. 6 is an exploded view of FIG. 3. Please refer to FIGS. 3, 4, 5 and 6 along with FIG. 2. The base frame portion 72 has four side walls 75. One of the side walls 75 is provided with two terminal recesses, to which the first and the second connecting terminal 80a, 80b are separately assembled. One of the terminal recesses includes a first receiving groove 76a, a first communicating groove 77a, and a first notch 78a; and the other terminal recess includes a second receiving groove 76b, a second communicating groove 77b, and a second notch 78b.

The first and second receiving grooves 76a, 76b respectively have an open side on the side wall 75, and are extended in a direction substantially perpendicular to the direction of the light axis α. Thus, each of the first and the second receiving groove 76a, 76b includes a pair of walls facing each other.

The first and second communicating grooves 77a, 77b respectively have an open side on the side wall 75 and another open side on the spring-member mounting face 72a. The first communicating groove 77a communicates with the first receiving groove 76a, and the second communicating groove 77b communicates with the second receiving groove 76b. A portion of a bottom wall of the first receiving groove 76a located at the light-out side of the light axis α is cut away to form the first notch 78a; and a portion of a bottom wall of the second receiving groove 76b located at the light-out side of the light axis α is cut away to form the second notch 78b.

As can be best seen in FIG. 6, the first connecting terminal 80a includes a first terminal portion 81a, a second terminal portion 82a, and a connecting portion 83a. The first terminal portion 81a is extended in a direction substantially in parallel with the direction of the light axis α to connect to the first part 60a of the spring member 60 located at the light-in side of the base 70, so that electric current can flow through the first connecting terminal 80a to the spring member 60. The second terminal portion 82a and the connecting portion 83a are located at an end of the first connecting terminal 80a opposite to the first terminal portion 81a. The second terminal portion 82a is extended in a direction substantially in parallel with the direction of the light axis α toward the light-out side. That is, the second terminal portion 82a has an extending direction opposite to that of the first terminal portion 81a. The connecting portion 83a is extended in a direction substantially perpendicular to the direction of the light axis α to connect to between the first terminal portion 81a and the second terminal portion 82a. When viewing in the direction of the light axis α from the light-in side, the first terminal portion 81a and the second terminal portion 82a are generally perpendicular to each other.

As can be best seen in FIG. 4, the connecting portion 83a of the first connecting terminal 80a is received in the first receiving groove 76a on the base 70; the first terminal portion 81a is extended through the first communicating groove 77a with a part of the first terminal portion 81a projected from the spring-member mounting face 72a toward the spring member 60, i.e. toward the light-in side; and the second terminal portion 82a is received in the first notch 78a to extend out of the terminal recess toward the light-out side of the base 70. The part of the first terminal portion 81a projected from the spring-member mounting face 72a is referred to as "projected portion 84a" herein.

As can be seen in FIG. 6, like the first connecting terminal 80a, the second connecting terminal 80b includes a first terminal portion 81b, a second terminal portion 82b, and a connecting portion 83b. The second terminal portion 81b is extended in a direction substantially in parallel with the direction of the light axis α to connect to the second part 60b of the spring member 60 located at the light-in side of the base 70, so that electric current can flow through the second connecting terminal 80b to the spring member 60. The second terminal portion 82b and the connecting portion 83b are located at an end of the first connecting terminal 80b opposite to the first terminal portion 81b. The second terminal portion 82b is extended in a direction substantially in parallel with the direction of the light axis α toward the light-out side. That is, the second terminal portion 82b has an extending direction opposite to that of the first terminal portion 81b. The connecting portion 83b is extended in a direction substantially perpendicular to the direction of the light axis α to connect to between the first terminal portion 81b and the second terminal portion 82b. When viewing along the light axis α from the light-in side, the first terminal portion 81b and the second terminal portion 82b are generally perpendicular to each other.

The second connecting terminal 80b and the first connecting terminal 80a are symmetrically arranged. That is, as shown in FIG. 4, the connecting portion 83b of the second connecting terminal 80b is received in the second receiving groove 76b on the base 70; the first terminal portion 81b is extended through the second communicating groove 77b with a part of the first terminal portion 81b projected from the spring-member mounting face 72a toward the spring member 60, i.e. toward the light-in side; and the second terminal portion 82b is received in the second notch 78b to extend out of the terminal recess toward the light-out side of the base 70. The part of the first terminal portion 81b projected from the spring-member mounting face 72a is referred to as "projected portion 84b" herein.

The first and the second connecting terminal 80a, 80b serve as power supply terminals to supply external electric power to the voice coil motor of the lens focusing device 10. More specifically, the second terminal portions 82a, 82b can be connected to an external circuit board (not shown) for electric current to flow therethrough. As can be seen from FIG. 5, the projected portion 84a of the first connecting terminal 80a is connected with the first outer ring portion 62a of the first part 60a of the spring member 60 to allow electric current to flow to the first outer ring portion 62a and accordingly to the winding 48 that has a first end connected to the first outer ring portion 62a; and the projected portion 84b of the second connecting terminal 80b is connected with the second outer ring portion 62b of the second part 60b of the spring member 60 to allow electric current to flow to the second outer ring portion 62b and accordingly to the winding 48 that has a second end connected to the second outer ring portion 62b. Thus, the winding 48 shown in FIG. 2 obtains electric power from the first and second outer ring portions 62a, 62b of the spring member 60 and the first and second connecting terminals 80a, 80b connected to the spring member 60 for driving the lens holder 50 to move.

Figure 7:
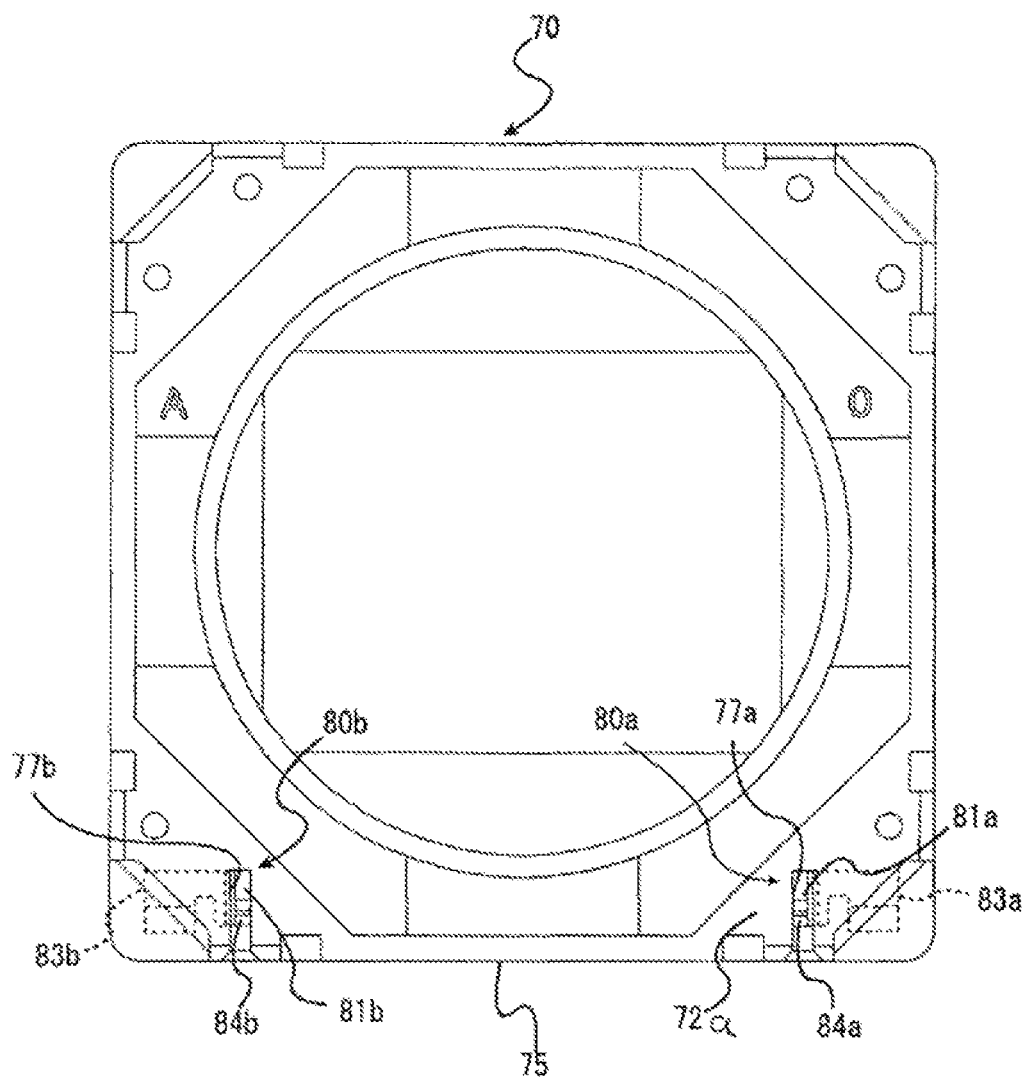
FIG. 7 is a top plan view of the base for the lens focusing device of the present invention with connecting terminals assembled thereto.
Figure 8:
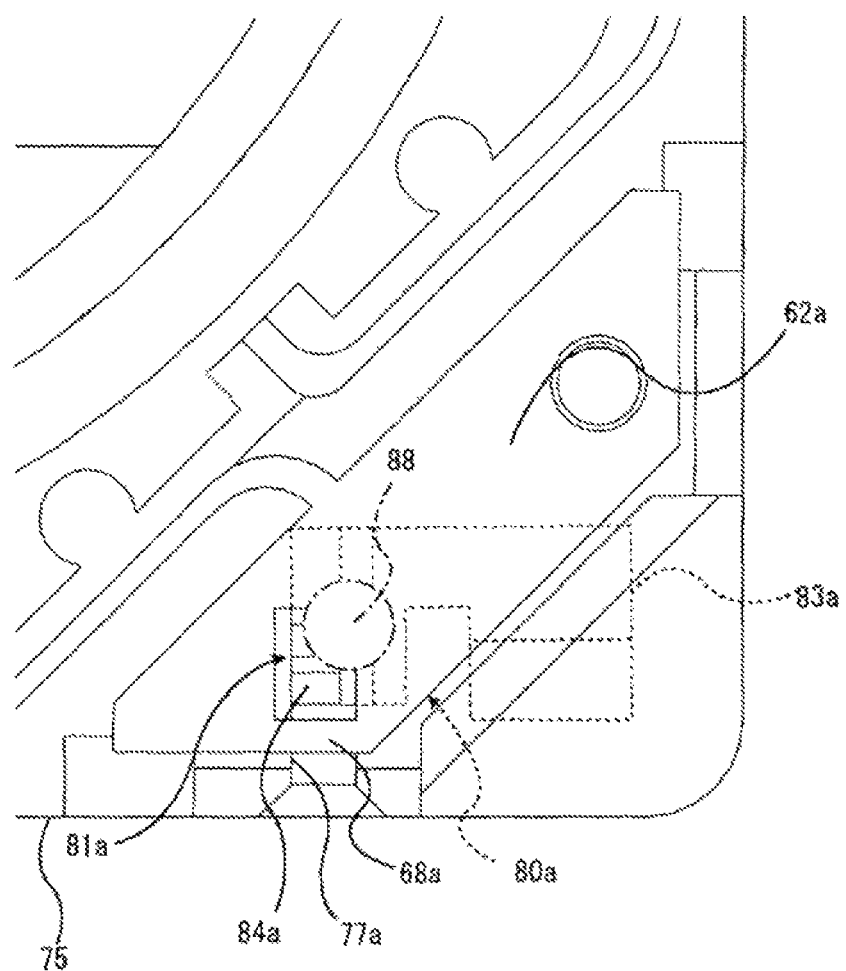
FIG. 8 is a fragmentary enlarged view of FIG. 7.

FIG. 7 is a top plan view of the base 70 viewed along the light axis α from the light-in side; and FIG. 8 is a fragmentary enlarged view of FIG. 7. Please refer to FIGS. 6, 7 and 8 that show the manner in which the first and second connecting terminals 80a, 80b as well as the spring member 60 are assembled to the base 70. In FIG. 6, arrows 90a, 90b respectively indicate the directions in which the first and second connecting terminal 80a, 80b are assembled to the terminal recesses on the base 70; and arrows 91a, 91b respectively indicate the directions in which the first part 60a and the second part 60b of the spring member 60 are fixed to the spring-member mounting face 72a of the base 70. As shown, the first and second connecting terminals 80a, 80b are assembled to the side wall 75 of the base 70 by disposing the connecting ports 83a, 83b in the first and second receiving groove 76a, 76b, respectively.

The first terminal portions 81a, 81b are respectively extended through the open sides of the first and second communicating grooves 77a, 77b on the spring-member mounting face 72a and the side wall 75. When the connecting portions 83a, 83b are respectively disposed in the first and second receiving grooves 76a, 76b, the first terminal portions 81a, 81b are simultaneously received in the first and second communicating grooves 77a, 77b from the side wall 75, and the second terminal portions 82a, 82b are also simultaneously received in the first and second notches 78a, 78b, as shown in FIG. 4.

Please refer to FIG. 7. After the first and second connecting terminals 80a, 80b are assembled to the base 70, the projected portions 84a, 84b of the first terminal portions 81a, 81b are projected from the spring-member mounting face 72a. Then, the first part 60a and the second part 60b of the spring member 60 are fixed to the spring-member mounting face 72a, as indicated by the arrows 91a, 91b.

FIG. 5 shows the spring member 60 has been mounted on the base 70, as being viewed along the light axis α from the light-in side. As shown, the first and second outer ring portions 62a, 62b of the first and second parts 60a, 60b of the spring member 60 are respectively provided with a through hole 67a, 67b, through which the projected portions 84a, 84b projected from the spring-member mounting face 72a are further extended.

As can be clearly seen in FIG. 8, the projected portion 84a extended through the first outer ring portion 62a is abutted on an outer edge portion 68a of the first outer ring portion 62a, so that the first terminal portion 81a is stopped from moving in the first communicating groove 77a. The projected portion 84a is then further soldered to the first outer ring portion 62a to prevent the first connecting terminal 80a from moving out of the spring member 60.

After the first and second connecting terminals 80a, 80b as well as the spring member 60 have been assembled to the base 70, it is necessary to ensure good electrical connection of the first and second connecting terminals 80a, 80b to the first and second parts 60a, 60b of the spring member 60. For this purpose, solder must be applied across the first terminal portion 81a, preferably including the projected portion 84a, and the first outer ring portion 62a to form a solidified solder portion 88, as shown in FIG. 8. Similarly, a solidified solder portion 88 is formed across the first terminal portion 81b and the second outer ring portion 62b.

The first and second connecting terminals 80a, 80b are not necessarily manufactured to have a configuration like that shown in FIG. 6. For example, the first and second connecting terminals according to another embodiment thereof are manufactured from two metal sheets 89a, 89b, which are bent for their surfaces to extend in different directions, as shown in FIG. 9, so that the second terminal portions 82a, 82b so formed are in parallel with the side wall 75 of the base 70 and the first terminal portions 81a, 81b so formed are respectively perpendicular to the second terminal portions 82a, 82b.

Figure 9:
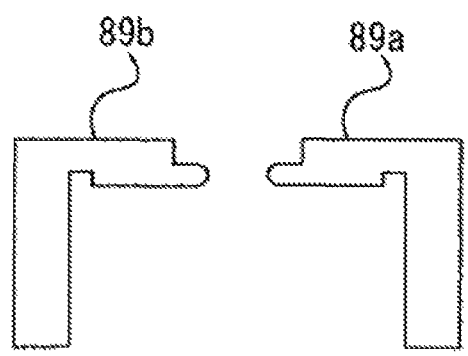
FIG. 9 shows the connecting terminals according to another embodiment thereof.

While the first and second connecting terminals 80a, 80b shown in FIG. 9 have simple configuration, they are suitable for mounting to a narrow base 70 and are therefore helpful in the miniaturization of the lens focusing device 10.

Please refer to FIG. 6. Since the connecting portions 83a, 83b of the first and second connecting terminals 80a, 80b are set in predetermined positions on the base 70 from the side wall 75 along the first and second receiving grooves 76a, 76b, respectively, it is very easy to accurately assemble the connecting terminals 80a, 80b to the base 70.

The first terminal portions 81a, 81b are extended from an end of the connecting portions 83a, 83b in a direction substantially parallel to the direction of the light axis α toward the light-in side. Therefore, free ends of the first terminal portions 81a, 81b are located adjacent to or projected from the spring-member mounting face 72a. With these arrangements, a good electrical connection of the free ends of the first terminal portions 81a, 81b to the spring member 60 fixed to the spring-member mounting face 72a can be easily ensured.

Since the first terminal portions 81a, 81b are extended through the first and second communicating grooves 77a, 77b provided on the base 70, it is able to more accurately fix the first and second connecting terminals 80a, 80b to the base 70 at predetermined positions without the risk of becoming separated therefrom.

When the lens focusing device 10 has a voice coil motor movable in a direction perpendicular to the light axis α, the lens focusing device 10 can also be used as an optical device having focusing and anti-shake functions. Moreover, in addition to soldering, other means, such as electrically conductive adhesive, hot melting or fastening via metal parts, can also be used to ensure good electrical connection of the first and second connecting terminals 80a, 80b to the first and second parts 60a, 60b of the spring member 60.

According to another embodiment different from that shown in FIG. 6, the first and second parts 60a, 60b of the spring member 60 may also be integrally formed when the connecting terminals 80a, 80b are embedded in the base 70, so long as the first and second part 60a, 60b are separated and electrically insulated from each other when they are used to drive the voice coil motor.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A lens focusing device, comprising:
   a lens holder for holding a lens therein;
   a base supporting the lens holder thereon while the lens holder is movable relative to the base for focusing purpose;
   at least one spring member being made of an electrically conductive material and elastically connected to between the base and the lens holder, the spring member having at least one through hole;
   at least one terminal recess being provided in one side wall of the base, and having at least two bend grooves extending in different directions, where one of the bend grooves extends in a direction perpendicular to a direction of a light axis; and
   at least one connecting terminal, separate from the at least one spring member, being set in the at least one terminal recess to electrically connect with the at least one spring member, the shape of the connecting terminal having at least two bends extending in different directions and corresponding to the terminal recess, including:
   a first terminal portion extended in the direction of the light axis of the lens toward a light-in side thereof to approach and connect to the at least one spring member;
   a second terminal portion extended in the direction of the light axis of the lens toward a light-out side thereof, wherein the first terminal portion and the second terminal portion are perpendicular to each other; and
   a connecting portion connected to between the first terminal portion and the second terminal portion and perpendicular to the first terminal portion and the second terminal portion, wherein the connecting portion is extended in a direction perpendicular to the direction of the light axis,
   wherein the first terminal portion extends from a portion of the connecting portion, the second terminal portion extends from another portion of the connecting portion and along opposite direction with the first terminal portion,
   wherein the first terminal portion has a projected portion received in the through hole and extending out of the through hole such that the projected portion is in contact with the spring member and electrically connects the spring member and the connecting terminal;
   wherein the at least one terminal recess includes a receiving groove provided in open side on one sidewall of the base and extends in a direction substantially perpendicular to the direction of the light axis;
   wherein the connecting portion is received in the receiving groove and the projected portion is extended along a direction opposite to an extending direction of the second terminal portion and toward the light-in side.

2. The lens focusing device as claimed in claim 1, wherein the base has a spring-member mounting face, and the first terminal portion of the at least one connecting terminal being projected from the spring-member mounting face to connect to the at least one spring member.

3. The lens focusing device as claimed in claim 2, wherein the at least one spring member includes a plurality of outer ring portions.

4. The lens focusing device as claimed in claim 1, wherein the at least one terminal recess includes a communicating groove, and a notch; the communicating groove having at least one open side formed on each of a light-in side and the side wall of the base, the opening of the communicating groove on the side wall of the base communicating with the receiving groove and the notch; and the at least one connecting terminal being set in the at least one terminal recess by disposing the connecting portion in the receiving groove, the first terminal portion in the communicating groove, and the second terminal portion in the notch.

5. The lens focusing device as claimed in claim 1, wherein the at least one connecting terminal is manufactured by bending a metal sheet.

6. The lens focusing device as claimed in claim 1, wherein two connecting terminals are included, the lens holder further includes a winding fitted around an outer side of the lens holder, and the at least one spring member includes a first part and a second part insulated from each other; one of the two connecting terminals being electrically connected to the first part of the at least one spring member and an end of the winding, while the other one of the two connecting terminals being electrically connected to the second part of the at least one spring member and another end of the winding, such that electric current is allowed to flow through the two connecting terminals and the at least one spring member to the two ends of the winding.

7. A lens focusing device comprising:
   a lens holder for holding a lens therein;
   a base supporting the lens holder thereon while the lens holder is movable relative to the base for focusing purpose;
   at least one spring member made of an electrical conductive material and elastically connected between the base and the lens holder, the spring member having at least one through hole;
   at least one terminal recess providing one side wall of the base, and having at least two bend grooves extending in different directions, wherein the at least one terminal recess includes a receiving groove extended in a direction substantially perpendicular to a direction of a light axis, a communicating groove, and a notch; the receiving groove having at least one open side formed on each of a light-in side and the side wall of the base, the opening of the communicating groove on the side wall of the base communicating with the receiving groove and the notch; and
   at least one connecting terminal separating from the at least one spring member, being set in the at least one terminal recess to electrically connect with the at least one spring member, the shape of the connecting terminal having at least two bends extending in different directions and corresponding to the terminal recess, including:
   a first terminal portion extended in the direction of the light axis of the lens toward a light-in side thereof to approach and connect to the at least one spring member;
   a second terminal portion extended in the direction of the light axis of the lens toward a light-out side thereof; and
   a connecting portion connecting between the first terminal portion and the second terminal portion and perpendicular to the first terminal portion and the second terminal portion, wherein the first terminal portion has a projected portion received in the through hole and extending out of the through hole such that the projected portion is in contact with the spring member and electrically connects the spring member and the connecting terminal;
   wherein the first terminal portion extends from a portion of the connecting portion, the second terminal portion extends from another portion of the connecting portion and along opposite direction with the first terminal portion, wherein the at least one terminal recess includes a receiving groove provided in open side on one sidewall of the base and extends in a direction substantially perpendicular to the direction of the light axis;

wherein the connecting portion is received in the receiving groove and the projected portion is extended along a direction opposite to an extending direction of the second terminal portion and toward the light-in side.

8. The lens focusing device as claimed in claim 1, wherein main surfaces of the first terminal portion, the second terminal portion and the connecting portion are perpendicular to each other.

9. The lens focusing device as claimed in claim 7, wherein main surfaces of the first terminal portion, the second terminal portion and the connecting portion are perpendicular to each other.

\* \* \* \* \*